(12) United States Patent
Fischer et al.

(10) Patent No.: US 7,510,161 B2
(45) Date of Patent: Mar. 31, 2009

(54) LONGITUDINAL GUIDING ELEMENT FOR MOTOR VEHICLE SEAT

(75) Inventors: Matthias Fischer, Kronach (DE); Jochen Hofmann, Marktgraitz (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 244 days.

(21) Appl. No.: 10/552,174

(22) PCT Filed: Mar. 30, 2004

(86) PCT No.: PCT/DE2004/000688

§ 371 (c)(1),
(2), (4) Date: Oct. 5, 2005

(87) PCT Pub. No.: WO2004/091962

PCT Pub. Date: Oct. 28, 2004

(65) Prior Publication Data

US 2006/0255228 A1    Nov. 16, 2006

(30) Foreign Application Priority Data

Apr. 10, 2003    (DE) ................. 103 17 239

(51) Int. Cl.
*F16M 13/00* (2006.01)
(52) U.S. Cl. .............. 248/429; 248/424; 297/311; 297/344.1
(58) Field of Classification Search .......... 248/424, 248/429; 297/311, 344.1, 344.11, 344.18, 297/376

See application file for complete search history.

(56) References Cited

U.S. PATENT DOCUMENTS

| 2,234,442 | A |   | 3/1941 | Lustig |
| 2,240,143 | A |   | 4/1941 | Lustig |
| 2,549,902 | A | * | 4/1951 | Hibbard et al. .......... 297/284.3 |

(Continued)

FOREIGN PATENT DOCUMENTS

DE    44 33 519 A1    3/1995

(Continued)

OTHER PUBLICATIONS

International Search Report dated Aug. 2, 2004 corresponding to PCT/DE2004/000688.

(Continued)

*Primary Examiner*—Amy J. Sterling
(74) *Attorney, Agent, or Firm*—Christie, Parker & Hale, LLP (57) ABSTRACT

The invention relates to a longitudinal guiding element for a motor vehicle seat, comprising two rail-type guide elements extending in the longitudinal direction of the seat, and a guiding device by which means one guide element can be displaced in the longitudinal direction of the seat in relation to the other guide element. According to the invention, a first sliding guide (3, 4) is formed by a guiding slide (3) provided on one rail (1) and a guiding pin (4) provided on the other rail (2), and the second sliding guide (5, 6) is formed by a guiding pin (5) provided on one rail (1) and a guiding slide (6) provided on the other rail (2). The two sliding guides are successively arranged in the longitudinal direction of the seat.

27 Claims, 5 Drawing Sheets

U.S. PATENT DOCUMENTS

| | | | | |
|---|---|---|---|---|
| 4,131,316 A | * | 12/1978 | Pallant et al. | 297/341 |
| 5,628,076 A | * | 5/1997 | Newton | 5/37.1 |
| 6,557,809 B2 | * | 5/2003 | Downey | 248/430 |
| 2003/0218369 A1 | * | 11/2003 | Akaike et al. | 297/344.15 |
| 2005/0116522 A1 | * | 6/2005 | Holdampf | 297/378.1 |

FOREIGN PATENT DOCUMENTS

| | | |
|---|---|---|
| EP | 0 088 015 A1 | 9/1983 |
| FR | 2 578 207 A2 | 9/1986 |
| JP | 7-257240 | 10/1995 |

OTHER PUBLICATIONS

Patent Abstract of Japan, Pub. No. 07257240, Published Oct. 9, 1995, in the name of Uramichi.

English translation of International Preliminary Report; dated Mar. 2, 2006; for International Application No. PCT/DE2004/000688, in the name of Brose Fahrzeugteile GmbH & Co. KG, Coburg.

* cited by examiner

FIG 3B

LONGITUDINAL GUIDING ELEMENT FOR MOTOR VEHICLE SEAT

CROSS-REFERENCE TO RELATED APPLICATION

This application is a National Phase Application of International Application Number PCT/DE2004/000688, filed on Mar. 30, 2004, which claims priority of German Patent Application 103 17 239.4, filed on Apr. 10, 2003.

BACKGROUND

The invention relates to a longitudinal guiding element for a motor vehicle seat.

A longitudinal guiding element for a seat of this kind comprises two guide elements extending in the longitudinal direction of the rail, and a guiding device by which the one guide element can be displaced relative to the other guide element in the longitudinal direction of the rail. By providing one of these two guide elements to hold an upholstery carrier of a motor vehicle seat and connecting the other guide element to the body floor of the motor vehicle it is possible to adjust the position of the corresponding motor vehicle seat in the seat longitudinal direction by moving the one guide element relative to the other guide element. By seat longitudinal direction is thereby meant that direction along which extend the thighs of a vehicle occupant sitting in the normal seated position on the corresponding vehicle seat.

The said guiding device has two sliding guides mounted one behind the other in the seat longitudinal direction which are each formed by a guiding slide and a guiding pin guided in the relevant sliding guide. When the one guide element is displaced relative to the other guide element in the seat longitudinal direction there follows a relative movement of the guiding pin in the associated guiding slide. This relative movement takes place independently of whether the guiding slide or the guiding pin is mounted on the guide part which is fixed on the body. In each case one of these two functional groups is mounted on the guide element which is fixed on the body and the other is mounted on the longitudinally displaceable guide element. With this type of longitudinal guiding element for a seat there is the problem that in the case of a small distance—compared to the overall length of the relevant guide element—between the two guide pins in the seat longitudinal direction there is the risk of damage to the arrangement in the event of stronger loads on the vehicle seat with corresponding torque.

The object of the invention is therefore to provide a longitudinal guiding element for a seat of the type mentioned at the beginning which is characterised by increased stability in respect of torque stresses.

BRIEF DESCRIPTION

This object is achieved according to the invention in that the first sliding guide is formed by a guiding slide provided on the one rail and by a guiding pin provided on the other rail whilst the second sliding guide is formed by a guiding pin provided on the one rail and by a guiding slide provided on the other rail.

Expressed in other words, a guiding slide of the first sliding guide and a guiding pin of the second sliding guide are mounted on one rail one behind the other, seen in the longitudinal direction of the seat, whilst a guiding pin of the first sliding guide and a guiding slide of the second sliding guide are mounted one behind the other on the other rail. It is hereby achieved that the distance between the two guiding pins changes when the two guide elements are displaced relative to each other in the seat longitudinal direction. This enables in turn a design of the guiding device overall such that in those longitudinal positions of the seat where a particular stability is required in respect of external torques a particularly wide distance can be provided between the two guiding pins in the seat longitudinal direction.

If the corresponding vehicle seat is a rear seat in the second or third row of seats in a vehicle where a displacement in the seat longitudinal direction always occurs to make it easier for passengers to get into the vehicle or if additional cargo space is to be provided in the boot of the vehicle then a particular stability is required for the arrangement when the guide elements are in a relative position in which the corresponding vehicle seat is set up for receiving a vehicle passenger. If the guide elements are however in a relative position only to allow easy entry into the vehicle or to provide additional cargo space then clearly the stability requirements for the arrangement are lower. The guiding slides and guiding pins are therefore to be arranged so that in the first mentioned case there is a particularly wide distance between the guiding pins in the seat longitudinal direction.

If for example the two guide elements are displaceable relative to each other in the rail longitudinal direction between a first and a second end position whereby the one end position corresponds to a position in which the corresponding vehicle seat is to serve to receive a vehicle occupant and the other end position corresponds to a position in which entry into the vehicle is to be made easier and/or additional cargo space is to be provided, and if these two end positions can be adjusted in that the two guiding slides of the guiding device each extend between a front stop in the seat longitudinal direction and a rear stop in the seat longitudinal direction which limit the movement of the relevant guiding pin in the guiding slide then preferably in the one end position of the two guide elements the guiding pin of the sliding guide at the front in the rail longitudinal guide bears against the front stop of the associated guiding slide whilst the guiding pin of the rear sliding guide in the rail longitudinal direction bears against the rear stop of the guiding slide. In this end position the widest possible distance is set between the two guiding pins which ensures a correspondingly strong stability. This end position of the guide elements consequently corresponds to a seat longitudinal position in which the corresponding vehicle seat serves to receive a vehicle occupant.

In the other end position of the two guide elements however the guiding pin of the front sliding guide in the rail longitudinal direction bears against its rear stop whilst the guiding pin of the rear sliding guide in the rail longitudinal direction bears against the front stop. This corresponds to the smallest possible distance between the two guiding pins so that here there is a lower stability in respect of torque stresses. In this end position of the two guide elements the vehicle seat is thereby preferably only set up to provide an enlarged cargo space or the like.

The two guide elements are preferably formed as seat side parts which are arranged horizontally side by side across the longitudinal direction of the seat and thereby form an inner and outer guide element whereby preferably the outer guide element is to be mounted fixed on the body and the inner guide element serves to receive the upholstery carrier. The said guide elements are preferably arranged in pairs on the two outer longitudinal sides of a motor vehicle seat.

In order to lock the longitudinal guiding element of the seat in its two end positions a locking device is provided which can be released by an unlocking lever in order to execute a longitudinal adjustment of the seat.

For a defined guide of the guiding pins in the associated sliding guides the guiding pins are supported in the relevant sliding guide on the one side along the vertical axis perpendicular to the seat longitudinal direction and on the other side along a first horizontal direction (horizontal cross direction) perpendicular to the seat longitudinal direction. The latter is thereby possible in that the guiding pins each engage through the relevant sliding guide and bear with a widened end section against the edge of the associated sliding guide. On the other hand the two guide elements can be supported against one another along the opposite horizontal direction.

In order to enable the described support of the individual elements of the guiding device against one another corresponding sliding areas are formed on the guiding slides.

According to a preferred embodiment of the invention the sliding areas are formed by a separate slider preferably made of plastics which is fixed on the relevant sliding guide. This slider preferably has two opposing slide faces to support the relevant guiding pin along the vertical axis as well as two further opposing slide faces to support the guiding pin along a first horizontal direction and to support the guide elements against one another along the second opposite horizontal direction transversely to the seat longitudinal direction.

The sliding regions of the slider preferably extend only over a part of the extension of the relevant guiding slide in the seat longitudinal direction so that that end section of the guiding slide in which the associated guiding pin is then housed when the seat longitudinal guide is located in an end position in which the corresponding vehicle seat is provided to receive a vehicle occupant is not covered by the sliding regions of the plastics slider. In this end position the guiding pin which is preferably made of metal then directly bears against the guiding slide which is likewise preferably made of metal so that the arrangement has a corresponding stability, more particularly there is no risk of damage to the plastics slider in the event of severe stresses. For a secure positioning of the relevant guiding pin in the said end section the latter preferably has suitably shaped support faces and tapers towards the end of the guiding slide.

BRIEF DESCRIPTION OF THE DRAWINGS

Further features and advantages of the invention will become apparent from the following description of an embodiment given by way of example with reference to the drawings.

FIG. 3b is a perspective view of a section of the longitudinal guiding element for a seat from FIG. 3a.

Figure 1A:
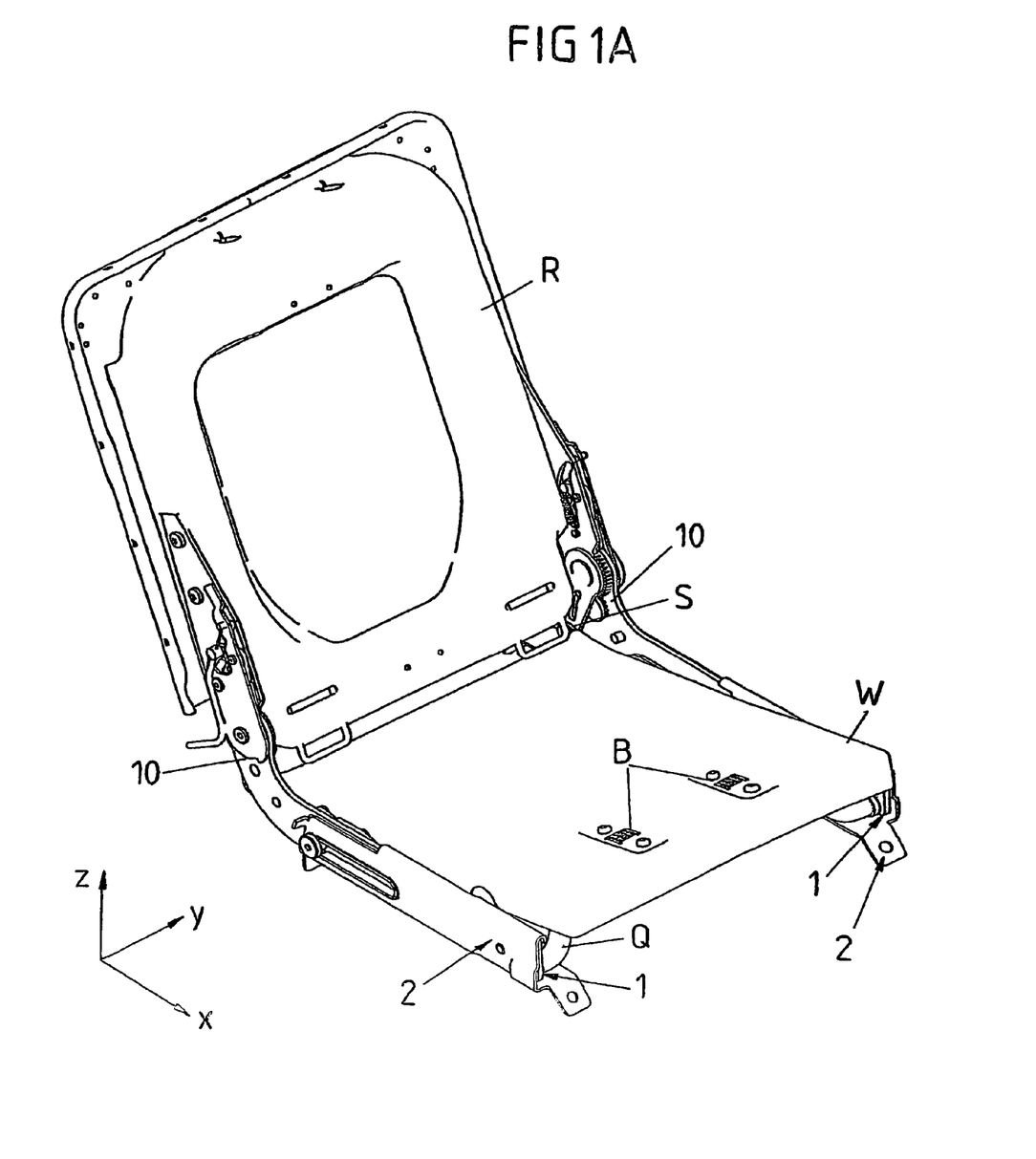
FIG. 1a is a perspective view of a motor vehicle seat located in the useful position with a backrest and a seat trough whose seat longitudinal position can be adjusted by a longitudinal guiding element.

FIG. 1a shows a motor vehicle seat which has a seat trough W to hold a seat cushion on which a vehicle occupant can sit, as well as a backrest R which serves to support the back of an occupant seated on the vehicle seat.

DETAILED DESCRIPTION

The seat trough W runs between two side parts 1 of the seat which each extend in the seat longitudinal direction x on the two longitudinal sides of the seat trough W. By seat longitudinal direction x is thereby meant that direction along which extend the thighs of a person sitting in the normal position on the corresponding vehicle seat. The two seat side parts 1 are connected to one another through a cross bar Q which has fixing points B for fixing the seat trough W on the cross bar Q in the region of the front end, see FIG. 1b. This cross bar Q extends horizontally along a direction y perpendicular to the seat longitudinal direction x.

By the front end of the seat trough W is meant here—seen in the seat longitudinal direction x—the end of the seat trough W at a distance from the backrest R. By rear end of the seat trough W is meant that end in the region of which the backrest R protrudes upwards from the seat underframe.

The two side parts 1 further define a bearing axis S on which the seat trough W is mounted in the region of its rear end. This extends along a horizontal direction y perpendicular to the seat longitudinal direction x.

Furthermore the two seat side parts 1 extending in the seat longitudinal direction x have in the region of their rear end an upwardly protruding end section 10 which serve as a backrest support for the backrest R and to which the backrest R is connected for swivel movement. The backrest thereby extends in its useful position illustrated in FIG. 1a in which it can serve to support the back of a vehicle occupant, along a vertical axis z substantially perpendicular to the seat longitudinal direction x as well as to the horizontal transverse axis y.

The two seat side parts 1 between which the seat trough W is housed are each mounted displaceable in the seat longitudinal direction x in a further outer side part 2 to be fitted fixed on the body floor, as will be explained in detail below with reference to FIG. 1b.

Figure 1B:
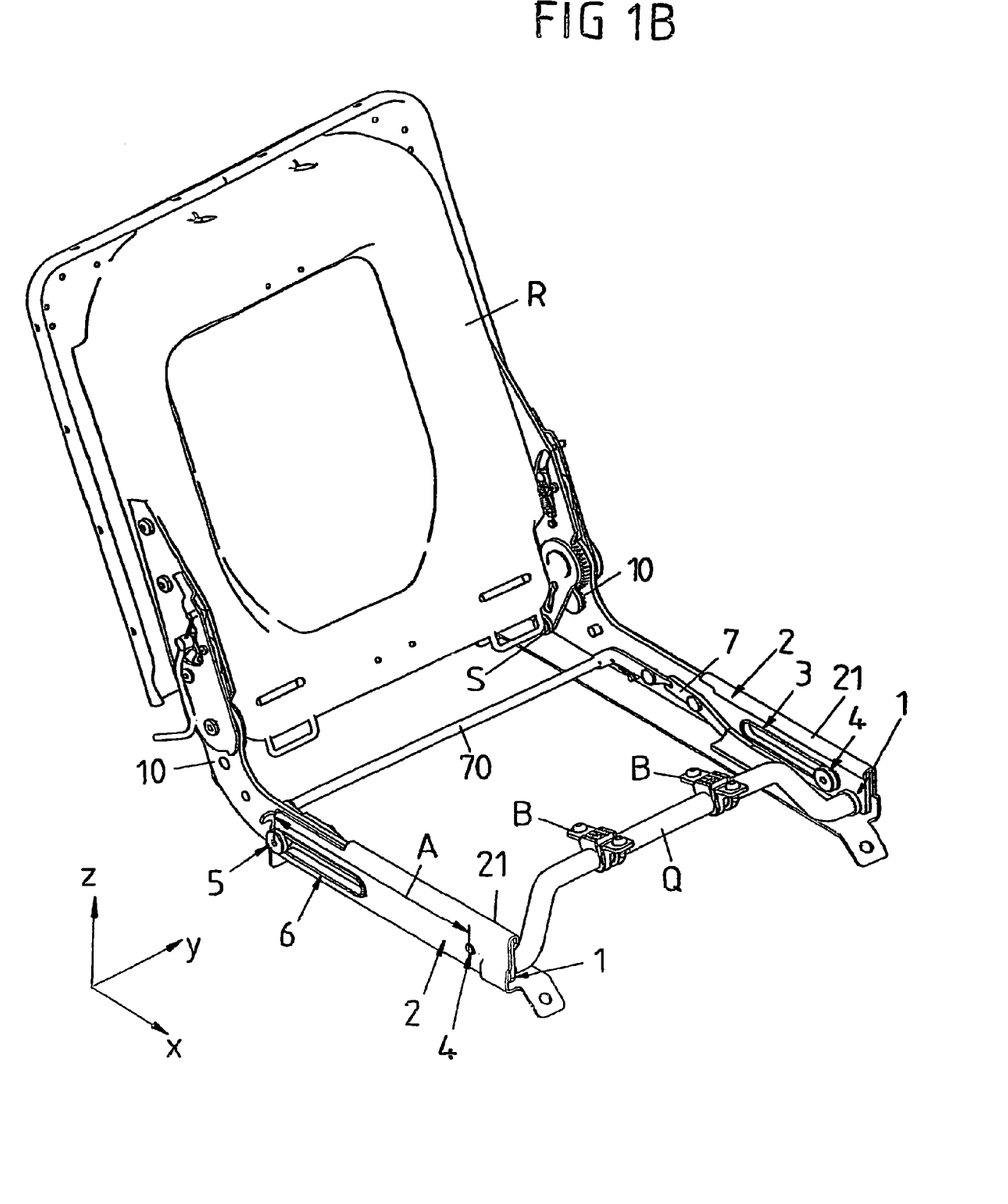
FIG. 1b is the motor vehicle seat of FIG. 1a without a seat trough.

FIG. 1b shows the vehicle seat of FIG. 1a without seat trough W so that it is possible to see the individual details of the guiding device by which the inner side parts 1 holding the seat trough W can be displaced in the seat longitudinal direction x relative to the outer side parts 2 which are to be mounted fixed on the body floor.

In FIGS. 1a and 1b the inner side parts 1 are thereby located relative to the outer side parts 2 in a rear position which corresponds to a useful position of the motor vehicle seat. This means in this position in which the vehicle seat can be locked by a locking lever 7 it is suitable to receive a vehicle occupant. By displacing the two inner side parts 1 from the position shown in FIGS. 1a and 1b forwards in the seat longitudinal direction x the seat trough W and the backrest R are shifted forwards in unison with the inner side parts 1. This enables additional cargo space to be provided behind the vehicle seat which is more particularly the rear seat of a motor vehicle. If the vehicle seat is a seat in the second row in a motor vehicle which has overall three rows of seats then by moving the seat trough W and backrest R forwards it becomes easier for passengers to enter the area in the third row of seats. The inner and outer side parts 1, 2 thus form guide elements which enable the seat trough W and backrest R to move in the seat longitudinal direction x. The outer side parts 2 thereby overlap the inner side parts 1 by a turned upper end section 21.

According to FIG. 1b the guiding device by which the inner side parts 1 can be moved relative to the outer side parts 2 has in each pair of side parts 1, 2 two sliding guides 3,4 and 5,6 arranged in succession in the seat longitudinal direction x and each consisting of a guiding slide 3, 6 and a bolt 4, 5 guided in the relevant guiding slide 3,6. A special feature of the vehicle seat illustrated in FIG. 1*b* thereby lies in the fact that in the case of the relevant front sliding guide 3, 4 in the seat longitudinal direction the guiding slide 3 is mounted on the inner side part 1 and the associated guiding pin in the form of a guide bolt 4 is mounted on the outer side part 2, whilst the rear sliding guides 5, 6 in the seat longitudinal direction are each formed by a guiding slide 6 formed on the outer side part 2 and by a guide bolt 5 mounted on the inner side part 1.

This means that in the case of the rear sliding guide 5, 6, compared with the front sliding guides 3, 4 it is possible to interchange the association between the guide bolt and guiding slide and the inner and outer seat side part. This has the result that in the useful state of the vehicle seat illustrated in FIGS. 1*a* and 1*b* where the inner side parts 1 are moved relative to the outer side parts 2 into their rearmost end position the front bolts 4 each bear against the front end of the associated sliding guide 3 and in the case of the rear sliding guides 5, 6 the bolts 5 each bear against the rear end of the associated sliding guide 6. The guide bolts 4, 5 mounted on each longitudinal side of the vehicle seat one behind the other in the seat longitudinal direction x thereby have a maximum spacing A in the seat longitudinal direction x which results in improved stability in the arrangement in respect of torque stresses.

With a conventional guiding device where for example all the guide bolts are each attached to the inner side parts 1 and all the guiding slides are attached to the outer side parts 2, the guide bolts would then in the state of the vehicle seat illustrated in FIG. 1*b* both each be at the rear end of the associated guiding slide. The distance between the guide bolts along the seat longitudinal direction x would thereby be considerably shorter.

Figure 2:
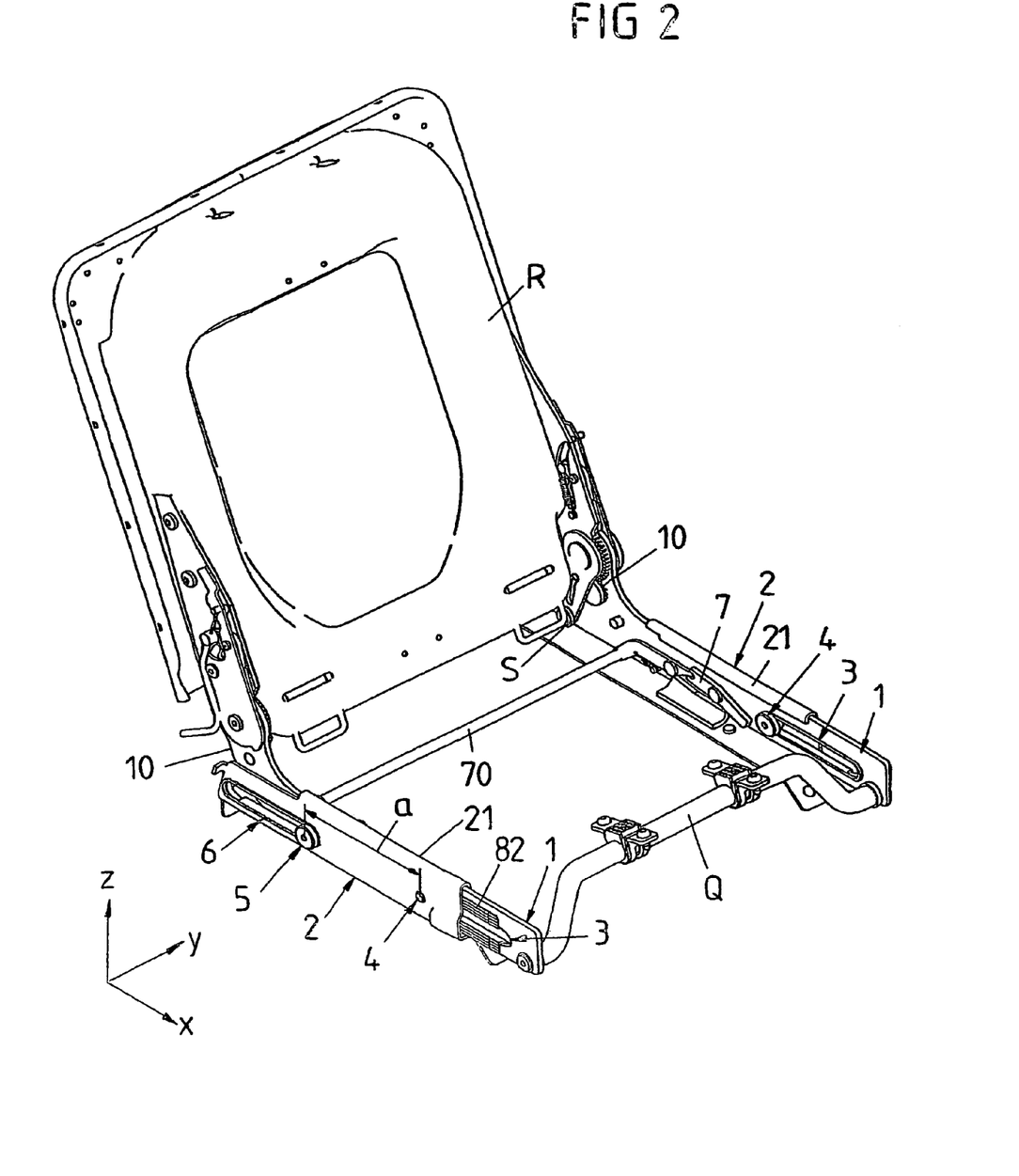
FIG. 2 is a view of the motor vehicle seat of FIGS. 1a and 1b after adjustment of the seat longitudinal position.

FIG. 2 shows the vehicle seat of FIGS. 1*a* and 1*b* after the maximum forward displacement of the inner side parts 1 in the seat longitudinal direction (together with the relevant front guiding slide 3 and the relevant rear guide bolt 5). For this, locking levers 7 have previously been unlocked by an unlocking rod 70 sprung in the locking device in order to enable the inner side parts 1 to move forwards relative to the outer side parts 2.

It can be seen from FIG. 2 that in the forwardly adjusted state of the inner side parts 1 (and thus also of the seat trough W and the backrest R) the front guide bolts 4 each bear against the rear end of the associated guiding slide 3 and the rear guide bolts 5 each bear against the front end of the associated guiding slide 6. Compared with the useful position of the vehicle seat illustrated in FIGS. 1*a* and 1*b* there is here a clearly shorter distance a between the front and rear guide bolts 4, 5 in the seat longitudinal direction x. This is however not a problem because the motor vehicle seat in the forwardly displaced seat position illustrated in FIG. 2 serves not to receive a vehicle occupant but rather only to provide an enlarged stowage space behind the vehicle seat or to provide easy entry for the vehicle passenger behind the vehicle seat.

As a result the guide bolts 4, 5 move up to each other when the inner side parts 1 are shifted forwards from the useful position, and move away from each other when the inner side parts 1 are pushed back again into the useful position illustrated in FIGS. 1*a* and 1*b*.

In order to prevent the motor vehicle seat from being moved through misuse e.g. by a child sifting on the relevant seat, from the useful position illustrated in FIGS. 1*a* and 1*b* into the forwardly displaced position illustrated in FIG. 2, according to a further development of the invention the unlocking lever (in the form of an unlocking rod 70) can only be accessible to a passenger when the backrest R has been folded forwards onto the seat trough W. The motor vehicle seat can in this case only then be moved forward from its useful position when the backrest R has been folded forwards onto the seat trough W to provide additional cargo space. This preferred further development of the invention is obviously only applicable in those vehicle seats where the backrest can be folded forwards in the normal way onto the seat surface.

In order to completely rule out an occupant taking his place on the vehicle seat in the forwardly displaced position shown in FIG. 2 the backrest which has been folded forwards onto the seat trough can be locked in the forwardly displaced position of the seat so that it can only be unlocked and raised up again after it has moved back into its useful position (according to FIGS. 1*a* and 1*b*).

Figure 3A:
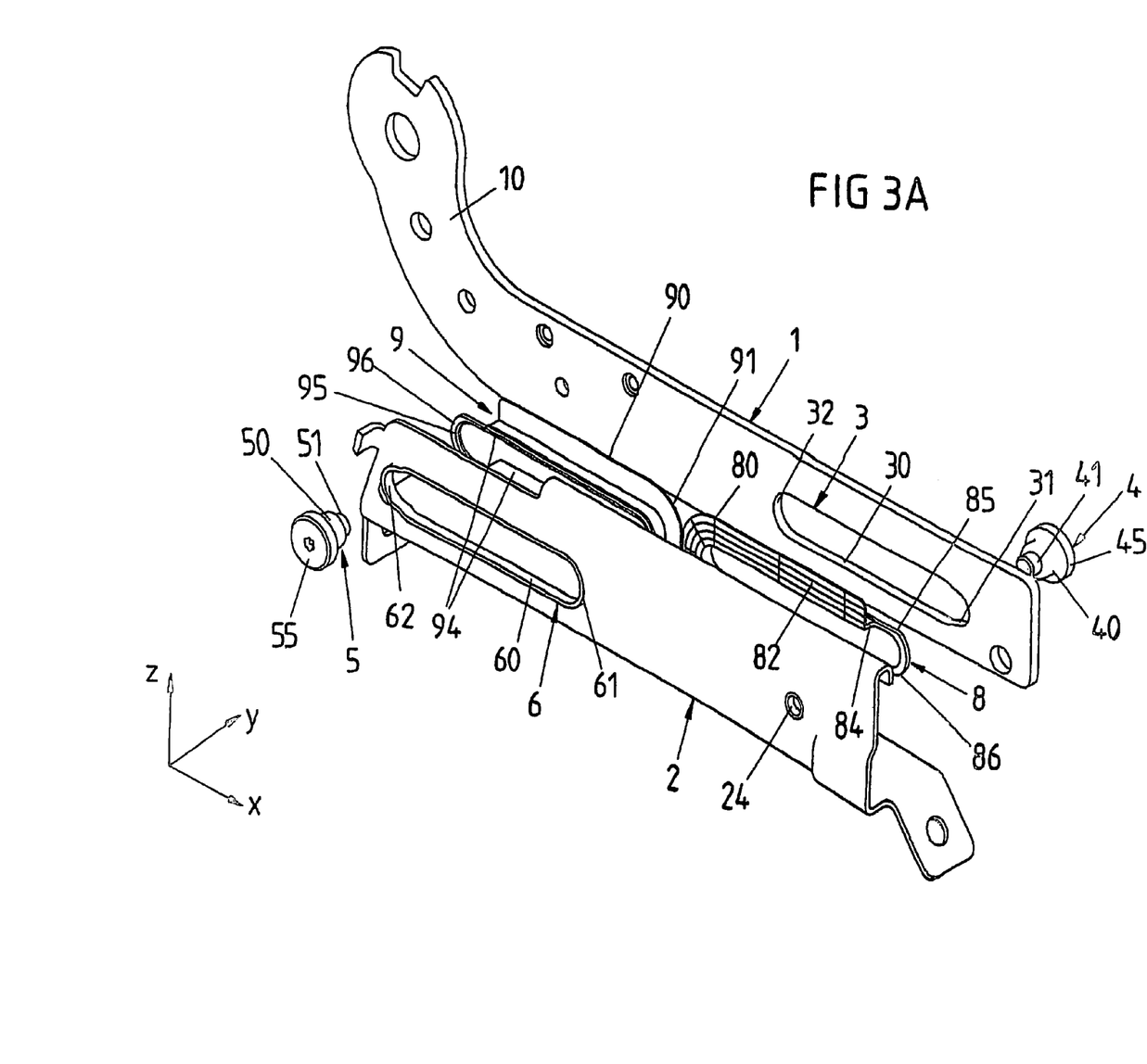
FIG. 3a is an exploded view of the longitudinal guiding element for a seat from FIGS. 1a and 1b.
Figure 3B:
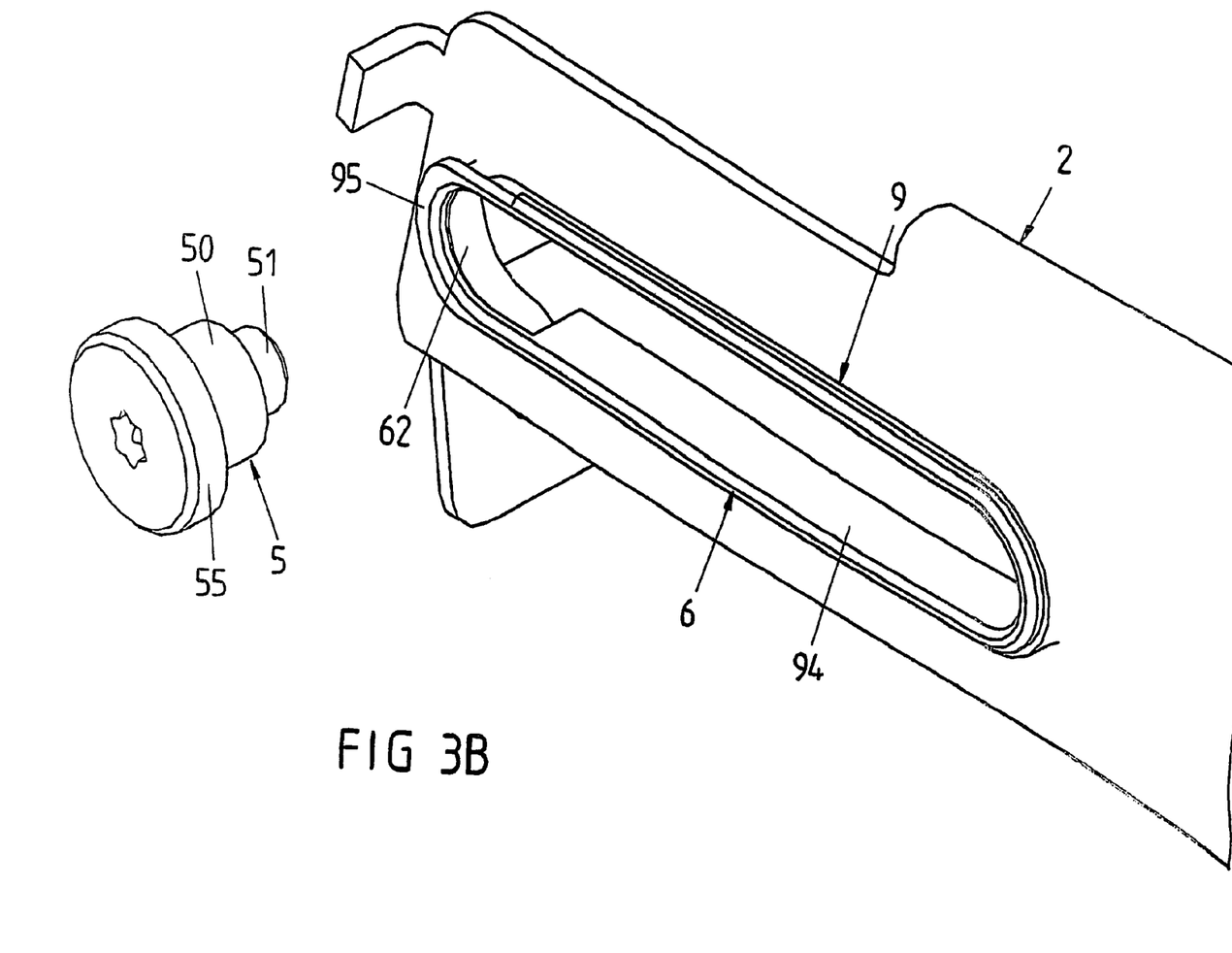

The construction of the relevant guiding device is shown in detailed form in FIGS. 3*a* and 3*b* using the example of an inner side part 1 and outer side part 2.

Each guiding device comprises a front sliding guide 3, 4 and a rear sliding guide 5, 6 whereby the front sliding guide 3, 4 consists of a guiding slide 3 formed on the inner side part 1 and of a guide bolt 4 fixed at a fixing point 24 on the outer side part 2 and the relevant rear sliding guide 5, 6 consists of a guiding slide 6 formed on the outer side part 2 and a guide bolt 5 fixed on the inner side part 1.

The guide bolts 4, 5 have at one axial end a fixing section 41 and 51 with which they are fixed on the associated side part 2 and 1 respectively, and are provided at the other axial end each with a head 45 or 55 by which they project out of the relevant guiding slides 3 and 6. Between the fixing section 41, 51 and the relevant head 45 and 55 extends a sliding section 40, 50 designed as a connecting section and with which the relevant guide bolts 4, 5 can slide in the associated guiding slides 3 and 6.

In order to facilitate the sliding movement of the guide bolts 4, 5 in the relevant associated guiding slide 3, 6 between the front and rear ends 31, 32 and 61, 62 a slider 8, 9 made of plastics and having a circumferential fixing frame 86, 96 is inserted in each guiding slide 3, 6.

The sliding regions 80 and 90 of the relevant sliders 8, 9 respectively comprise on the one side slide faces 84, 94 opposite one another along the vertical axis z between which the guide bolts 4, 5 are guided through their slide sections 40, 50 and on which they are supported along the vertical axis z. Furthermore the sliding regions 80, 90 of the sliders 8, 9 each have a sliding face 82, 91 which point away from the relevant guiding slide 3, 6 in the direction of the relevant other side part 2, 1. Each other side part 2, 1 slides on these slide faces 82, 91 respectively as the inner side parts 1 slide along relative to the outer side parts 2.

Finally the fixing frames 86, 96 of the sliders 8, 9 each still form a slide face 85, 95 which point away from the relevant guiding slide 3, 4 in the direction of the head 45, 55 of the relevant associated guide bolt 4, 5. The guide bolts 4, 5 are hereby supported on these slide faces 85, 95 along the transverse axis y on the sliders 8, 9 each opposite the direction along which each other side part 2, 1 is supported on the slide face 82, 91 provided for this on the relevant slider 8, 9 along the horizontal transverse axis y.

It can further be seen from FIGS. 3*a* and 3*b* that the front guiding slide 3 tapers in the region of its front end 31 and the rear guiding slide 6 tapers in the region of its rear end 92. Furthermore the slider 8 associated with the front guiding slide 3 in the region of its front end has no slide faces 84 for vertical support of the associated bolt 4 and the slider 9 associated with the rear guiding slide 6 has in the region of its rear end no slide face 94 serving for the vertical support of the associated guide bolt 5 since the corresponding slide faces 84, 94 each do not extend over the overall length of the associated guiding slide 3, 6.

This means that in the useful position of the vehicle seat shown in FIGS. 1a and 1b where the seat is provided for receiving the vehicle occupant and where the front bolt 4 bears against the front end 31 of the associated guiding slide 3 and the rear bolt bears against the rear end 62 of the associated guiding slide 6, the guide bolts 4, 5 each bear with their sliding sections 40, 50 directly against the inside wall 30 and 60 of the relevant guiding slides 3, 6. This prevents strain on the plastics sliders 8, 9 from the increased weight of a vehicle seat occupied by a passenger. The guide bolts 4, 5 each consisting of metal and the inside walls 60, 90 of the guiding slides 6, 9 likewise consisting of metal then act directly on one another.

In that the guiding slides 3, 6 each taper in their end sections not covered by the slide faces (in the region of the front end 31 of the front guiding slide 3 and in the region of the rear end 62 of the rear guiding slide 6) the smoothest possible transition without steps is provided for the guide bolts 4,5 between the sliding regions 80, 90 and the said end sections of the relevant guiding slides 3,6.

In a further development of the arrangement illustrated in FIGS. 1a to 3b it can be proposed that the front and rear guiding slides 3, 6 overlap one another in the region of their facing ends 32, 61 in the useful position of the vehicle seat (see FIGS. 1a and 1b) in the seat longitudinal direction x. This corresponds to an enlarged extension of the guiding slides 3, 6 in the seat longitudinal direction x and sets up a larger displacement path for the side parts 1, 2 relative to each other in the seat longitudinal direction x. The risk of a collision between the guide bolts 4,5 does not arise here since in the useful position of the motor vehicle seat where the guide slides 3, 6 would overlap one another the front guide bolt 4 is mounted in the region of the front end 31 of the front guiding slide 3 and the rear guide bolt 5 is mounted in the region of the rear end 62 of the rear guiding slide 6. The guide bolts 4,5 are thus located precisely against the ends 31, 62 of the guiding slides 3, 6 remote from the overlapping region 32, 61. During subsequent displacement of the motor vehicle seat from the useful position into the forwardly displaced position shown in FIG. 2 the guide bolts 4, 5 do indeed move towards each other since the rear guide bolt 4 arrives at the rear end 32 of the front guiding slide 3 but the two guiding slides 3, 6 move away from each other at the same time so that the facing ends 32, 61 of the guiding slides 3, 6 no longer overlap and the risk of collision between the guide bolts 4, 5 does not arise.

In any case in the event of the guiding slides 3, 6 overlapping the associated sliders 8, 9 must be designed so that there is no risk of the sliders 8, 9 colliding. For this the sliders 8, 9 can be configured accordingly in their facing end sections, for example in that one slider 8 is only provided with the slide faces along its lower side in the vertical direction, and the other slider 9 is only provided with slide faces along its upper side in the vertical direction.

The invention claimed is:

1. A longitudinal guiding element for a motor vehicle seat comprising:
    a one-piece first guide element extended in a seat longitudinal direction;
    a one-piece second guide element extended in the seat longitudinal direction; and
    a guiding device by which the first guide element is displaced in the seat longitudinal direction relative to the second guide element wherein the guiding device comprises two sliding guides mounted one behind the other in the seat longitudinal direction and each have a guiding slide and a guiding pin guided in the guiding slide;
    wherein a first sliding guide of the two sliding guides is formed by a guiding slide provided on the first guide element and a guiding pin projecting from the second guide element to slide in the guiding slide of the first guide element and that a second sliding guide of the two sliding guides is formed by a guiding pin projecting from the first guide element and a guiding slide provided on the second guide element to slidably receive the guiding pin of the first guide element, wherein the distance between the two guiding pins changes when the first and second guide elements are displaced relative to each other.

2. The longitudinal guiding element for a seat according to claim 1, wherein the two guide elements are displaceable relative to each other in the seat longitudinal direction between a first end position and a second end position.

3. The longitudinal guiding element for a seat according to claim 2, wherein the first guiding slide and the second guiding slide each extend between a front stop in the seat longitudinal direction and a rear stop in the seat longitudinal direction wherein the stops restrict movement of the guiding pins in the guiding slides.

4. The longitudinal guiding element for a seat according to claim 3 wherein in one end position of the two guide elements the guiding pin of a front sliding guide in the seat longitudinal direction bears against the front stop of the guiding slide and the guiding pin of a rear sliding guide in the seat longitudinal direction bears against the rear stop of the guiding slide.

5. The longitudinal guiding element for a seat according to claim 4 wherein in the other end position of the two guide elements the guiding pin of the front sliding guide in the seat longitudinal direction bears against the rear stop of the guiding slide and the guiding pin of the rear sliding guide in the seat longitudinal direction bears against the front stop of the guiding slide.

6. The longitudinal guiding element for a seat according to claim 4 wherein the one end position of the guide elements corresponds to a useful position of the seat in which this is provided for use by a vehicle passenger, and that the other end position of the guide elements corresponds to a displaced position of the seat in which this is not provided to receive a vehicle occupant.

7. The longitudinal guiding element for a seat according to claim 1, wherein one guide element is provided to receive an upholstery carrier of a motor vehicle seat and the other guide element is provided for fixing on a structural assembly fixed on a floor of the motor vehicle.

8. The longitudinal guiding element for a seat according to claim 1, wherein the two guide elements are mounted side by side horizontally across the seat longitudinal direction and form an inner guide element and an outer guide element.

9. The longitudinal guiding element for a seat according to claim 1, wherein the two guide elements are arranged as a pair on each of the two longitudinal sides of a motor vehicle seat.

10. The longitudinal guiding element for a seat according to claim 1, wherein a locking device is provided for locking the guiding device in at least one seat longitudinal position.

11. The longitudinal guiding element for a seat according to claim 1, wherein each guiding pin is supported in an associated guiding slide along a horizontal axis perpendicular to the seat longitudinal direction.

12. The longitudinal guiding element for a seat according to claim 1, wherein each guiding pin is supported at an edge of an associated guiding slide along a horizontal transverse direction perpendicular to the seat longitudinal direction.

13. The longitudinal guiding element for a seat according to claim 1, wherein the two guide elements are supported against one another at an edge of each guiding slide along a horizontal transverse direction perpendicular to the seat longitudinal direction.

14. The longitudinal guiding element for a seat according to claim 1, wherein in each guiding slide there is a. slider for supporting at least one of an associated guiding pin and the other guide element.

15. The longitudinal guiding element for a seat according to claim 14, wherein each slider has at least one support face for supporting the associated guiding pin in a vertical direction and at least one support face for supporting at least one of the associated guiding pin and the other guide element in a horizontal direction across the seat longitudinal direction.

16. The longitudinal guiding element for a seat according to claim 15, wherein the support faces enable a support in two oppositely aligned directions along the vertical axis and a support in two oppositely aligned directions along the horizontal axis perpendicular to the seat longitudinal direction.

17. The longitudinal guiding element for a seat according to one of claims 14 to 16, wherein the sliders are made of plastics.

18. The longitudinal guiding element for a seat according to claim 14 wherein, each slider extends with at least one part of a slide region in the seat longitudinal direction only over a part of an extension of an associated guiding slide.

19. The longitudinal guiding element for a seat according to claim 18, wherein the two guide elements are displaceable relative to each other in the seat longitudinal direction between a first end position and a second end position and wherein in an end position of the first and second end positions serving as the useful position of the two guide elements the guiding pins are not supported on the associated sliders along the vertical axis.

20. The longitudinal guiding element for a seat according to claim 19, wherein the guiding pins in the first end position of the guide elements are not supported on the associated sliders along the vertical axis.

21. The longitudinal guiding element for a seat according to claim 19 wherein each guiding slide tapers in an end section which is free of a slide region of an associated slider in order to provide a continuous smooth transition between the slide region and the end section of the guiding slide.

22. The longitudinal guiding element for a seat according to claim 1, wherein the guide elements and the guiding pins are made of metal.

23. A motor vehicle seat having a longitudinal guiding element for the seat comprising:
a one-piece first guide element extended in a seat longitudinal direction;
a one-piece second guide element extended in a seat longitudinal direction;
a backrest; and
a guiding device by which the first guide element is displaced in the seat longitudinal direction relative to the second guide element;
wherein the guiding device comprises two sliding guides mounted one behind the other in the seat longitudinal direction and each have a guiding slide and a guiding pin guided in the guiding slide;
wherein a first sliding guide is formed by a guiding slide provided on the first guide element and a guiding pin projecting from the second guide element to slide in the guiding slide of the first guide element and that a second sliding guide of the two sliding guides is formed by a guiding pin projecting from the first guide element and a guiding slide provided on the second guide element to slidably receive the guiding pin of the first guide element, wherein the distance between the two guiding pins changes when the first and second guide elements are displaced relative to each other.

24. The motor vehicle seat according to claim 23, wherein the backrest is foldable from at least one upright position in which it serves to support a back of a vehicle occupant forwards in a direction of a seat underframe of the vehicle seat.

25. The motor vehicle seat according to claim 24 wherein a locking device is provided for locking the guiding device in at least one seat longitudinal position and wherein the locking device is associated with an unlocking element and that the unlocking element is only accessible for unlocking the locking device when the backrest is folded forwards.

26. A motor vehicle seat having a longitudinal guiding element for the seat comprising:
two guide elements extended in a seat longitudinal direction; and
a guiding device by which one guide element is displaced in the seat longitudinal direction relative to the other guide element;
wherein the guiding device comprises two sliding guides mounted one behind the other in the seat longitudinal direction and each have a guiding slide and a guiding pin guided in the guiding slide;
wherein a first sliding guide is formed by a guiding slide provided on the one guide element and a guiding pin provided on the other guide element and that a second sliding guide of the two sliding guides is formed by a guiding pin provided on the one guide element and a guiding slide provided on the other guide element, and further comprising a backrest;
wherein the two guide elements are displaceable relative to each other in the seat longitudinal direction between a first end position and a second end position;
wherein the first guiding slide and the second guiding slide each extend between a front stop in the seat longitudinal direction and a rear stop in the seat longitudinal direction wherein the stops restrict movement of the guiding pins in the guiding slides;
wherein in one end position of the two guide elements the guiding pin of a front sliding guide in the seat longitudinal direction bears against the front stop of the guiding slide and the guiding pin of a rear sliding guide in the seat longitudinal direction bears against the rear stop of the guiding slide;
wherein the one end position of the guide elements corresponds to a useful position of the seat in which this is provided for use by a vehicle passenger, and that the other end position of the guide elements corresponds to a displaced position of the seat in which this is not provided to receive a vehicle occupant;
wherein the backrest is lockable in its forward-folded position and that the backrest can only then be released for raising back up into its upright position when the longitudinal guiding element of the seat is located in the useful position; and
wherein the backrest is foldable from at least one upright position in which it serves to support a back of a vehicle occupant forwards in a direction of a seat underframe of the vehicle seat.

27. The motor vehicle seat according to claim 26, wherein a locking device is provided for locking the guiding device in at least one seat longitudinal position and wherein the locking device is associated with an unlocking element and that the unlocking element is only accessible for unlocking the locking device when the backrest is folded forwards.

* * * * *